(12) United States Patent
Pitance

(10) Patent No.: US 12,466,657 B2
(45) Date of Patent: Nov. 11, 2025

(54) PALLET SWITCHING CONVEYOR

(71) Applicant: CONCEPT & FORME DEVELOPPEMENTS SA, Profondeville (BE)

(72) Inventor: Gerard Pitance, Profondeville (BE)

(73) Assignee: CONCEPT & FORME DEVELOPPEMENTS SA, Profondeville (BE)

( * ) Notice: Subject to any disclaimer, the term of this patent is extended or adjusted under 35 U.S.C. 154(b) by 95 days.

(21) Appl. No.: 18/685,931

(22) PCT Filed: Mar. 22, 2022

(86) PCT No.: PCT/EP2022/057557
§ 371 (c)(1),
(2) Date: Feb. 23, 2024

(87) PCT Pub. No.: WO2023/025421
PCT Pub. Date: Mar. 2, 2023

(65) Prior Publication Data
US 2025/0178842 A1    Jun. 5, 2025

(30) Foreign Application Priority Data
Aug. 24, 2021  (EP) ..................... 21192722

(51) Int. Cl.
*B65G 17/12* (2006.01)
*B65G 17/24* (2006.01)
*B65G 17/00* (2006.01)

(52) U.S. Cl.
CPC ........... *B65G 17/123* (2013.01); *B65G 17/24* (2013.01); *B65G 17/002* (2013.01); *B65G 2201/0267* (2013.01)

(58) Field of Classification Search
CPC .... B65G 17/123; B65G 17/24; B65G 17/007; B65G 2201/0267
(Continued)

(56) References Cited

U.S. PATENT DOCUMENTS 2,092,737 A * 9/1937 Perry ................... A43D 117/00
                                                                12/1 A
2,195,326 A * 3/1940 Crawford ............. B65G 17/126
                                                                198/798
(Continued)

FOREIGN PATENT DOCUMENTS

AU    1634797 A    9/1997
DE    2263767 A1   7/1974
(Continued)

*Primary Examiner* — Mark A Deuble
(74) *Attorney, Agent, or Firm* — Leydig, Voit & Mayer, Ltd.

(57) ABSTRACT

A pallet switcher includes: a supporting structure; at least two mobile frames, each for carrying a pallet, each mobile frame of the at least two mobile frames including a first pair of rollers and a second pair of rollers on lateral sides of the mobile frame; a conveyor system located on the supporting structure for allowing movement of the at least two mobile frames, the conveyor system being connected to a drive shaft; a set of guiding grooves forming a closed loop having separate rails, and a guiding path for each mobile frame, the set of guiding grooves having a first path and a second path, the grooves receiving the rollers of the mobile frames; and a cam switching system for the pairs of rollers in the guiding grooves, the cam switching system guiding the pairs of rollers so that the first pair of rollers follows the first path.

13 Claims, 15 Drawing Sheets

(58) Field of Classification Search
USPC .................................................. 198/797–800
See application file for complete search history.

(56) References Cited

U.S. PATENT DOCUMENTS

| | | | |
|---|---|---|---|
| 2,369,840 A | | 2/1945 | Nalbach et al. |
| 2,512,356 A | * | 6/1950 | Massiello ................ A21B 1/48 |
| | | | 34/208 |
| 2,893,538 A | * | 7/1959 | Buttironi ................ B65G 35/08 |
| | | | 198/798 |
| 2,965,049 A | * | 12/1960 | Royer ...................... A21B 1/46 |
| | | | 198/798 |
| 4,200,186 A | * | 4/1980 | Boettcher ............. B65G 17/48 |
| | | | 198/867.14 |
| 6,318,543 B1 | * | 11/2001 | Hicks ................... B65G 17/123 |
| | | | 198/800 |
| 7,344,015 B2 | * | 3/2008 | Mustalahti ............ B65G 17/18 |
| | | | 198/321 |
| 9,796,531 B2 | * | 10/2017 | Ishibashi ................ B65G 23/38 |
| 2016/0145048 A1 | * | 5/2016 | Ishibashi ................ B65G 17/18 |
| | | | 198/800 |
| 2017/0081128 A1 | | 3/2017 | Okazaki et al. |
| 2019/0031444 A1 | | 1/2019 | Ishibashi et al. |
| 2022/0009723 A1 | | 1/2022 | Schuesslburner |

FOREIGN PATENT DOCUMENTS

| | | |
|---|---|---|
| DE | 102014220046 A1 | 4/2016 |
| EP | 2138430 A1 | 12/2009 |
| JP | S 49 38374 A | 4/1974 |
| WO | WO 2020/094318 A1 | 5/2020 |

\* cited by examiner

PALLET SWITCHING CONVEYOR

CROSS-REFERENCE TO PRIOR APPLICATIONS

This application is a U.S. National Phase application under 35 U.S.C. § 371 of International Application No. PCT/EP2022/057557, filed on Mar. 22, 2022, and claims benefit to European Patent Application No. EP 21192722.3, filed on Aug. 24, 2021. The International Application was published in French on Mar. 2, 2023 as WO/2023/025421 under PCT Article 21(2).

FIELD

The present invention relates to the field of automated conveyors. In particular, the present invention relates to a pallet conveyor at the entrance/exit of an automated warehouse with towers.

BACKGROUND

In production workshops, the operating rate of machine tools is often penalized by the periods of work interruption following handling operations related to providing raw parts to be shaped and removing these shaped parts. The present analysis is particularly focused on the case of manual and/or automated press brakes, but it can be adapted to other fields requiring procurement and evacuation flows of different materials, the optimization of which allows increased operating rates of production tools.

Several scenarios can be observed during the provision and removal of parts. In a first case, the press brake is controlled by an operator who is also responsible for handling, namely supplying their workstation with parts to be bent and removing the bent parts, the larger volume of which leads quite quickly to a saturation of the available space and the need to free up this space to provide new parts to be manufactured. The drawback of this situation is that the machine is not productive during periods of time when the operator is busy with manual handling tasks. Furthermore, the operator must sometimes wait for a lifting device, generally a lift shared among several stations, to become available, which further increases the downtime of the machine and its operator.

In a second case, the handling operations (provision and removal) are performed by a handler controlling several workstations. Machine operators can thus fully focus on their specific task. In this case, the periods of time when the machine is unproductive are determined, on the one hand, by the waiting time for the handler to be available, who can sometimes be occupied on another workstation, and on the other hand, by the time necessary for the handler to remove and restock the pallets to be removed, or even to remove an empty supply pallet and replace it with a new pallet of parts to be shaped.

In a third case, the press brake is automated, in which case reference is made to a bending cell. Part of the surface of the cell is dedicated to storing parts to be bent, which are generally placed on pallets. Another part of the cell surface is dedicated to the pallets intended to receive the parts after bending. As in the previous scenario, the productivity of the cell will depend on the availability of the handler and the handling times. The level of autonomy of the automated bending cell therefore remains dependent on the presence of both occasional and recurrent human assistance.

Therefore, there is currently a real interest in optimizing the operating rate of workstations via the instantaneous provision of what is required for their operation. Indeed, productivity is directly linked to the availability of the elements that workstations need.

Documents DE 10 2014 220 046 A1 and AU 1634797 A disclose devices for loading or unloading pallets comprising a spare pallet. The different pallets are moved by means of conveyor belts and a lift. Use is made of the fact that the loaded and empty pallets are at different heights, allowing them to be moved horizontally by sliding one below the other.

Document WO 2020/094318 A1 describes a closed-loop conveyor of the over/under type in which the pallets circulate on offset paths (rails). For this purpose, each pallet has a pair of front rolls, coupled to pads, and a pair of rear rolls. The pairs of rolls are mounted on different and offset pairs of rails. This allows the pallets to be kept substantially horizontal in the transfer areas on the conveyor, which is essential when transporting bottles, and it also allows them to be loaded/unloaded by means of a coupling system via edges and combs. Nevertheless, the transfer pallets here move "upside down" on the lower path of the loop.

Document JP S 49 38374 A discloses a car parking device, car by car. The pallets supporting the cars are arranged side by side, with two levels, an upper level and a lower level, respectively, and are mobile, with a mechanism to ensure that the pallet remains constantly parallel while the pallet moves from the upper to the lower level and vice versa. This disclosure offers a device in which each pallet is supported by front and rear wheels which roll on upper and lower horizontal rails connected by incurved rails. Intermediary incurved rails allows passage of the rear wheels owing to switching devices. The pallets are driven by endless chains running along the rails and connected at a rotary sprocket driven by an electrical motor.

SUMMARY

In an embodiment, the present invention provides a pallet switcher, comprising: a supporting structure; at least two mobile frames, each configured to carry a pallet, each mobile frame of the at least two mobile frames comprising a first pair of rollers and a second pair of rollers on lateral sides of the mobile frame; a conveyor system located on the supporting structure and configured to allow movement of the at least two mobile frames, the conveyor system being connected to a drive shaft; a set of guiding grooves forming a closed loop having separate rails, and a guiding path for each mobile frame, the set of guiding grooves comprising a first path and a second path, the grooves receiving the rollers of the mobile frames; and a cam switching system for the pairs of rollers in the guiding grooves, the cam switching system being configured to guide the pairs of rollers so that the first pair of rollers follows the first path and the second pair of rollers follows the second path so as to move the mobile frames along the closed loop while remaining permanently parallel to each other horizontally and oriented in a same direction, wherein the guiding grooves comprise a groove corresponding to an upper horizontal movement plane, a groove corresponding to a lower horizontal movement plane, two semi-circular grooves allowing downward movement from the upper plane to the lower plane, and two semi-circular grooves allowing upward movement from the lower plane to the upper plane, the guide grooves defining the first path and the second path, which have an oblong shape and are offset horizontally relative to one another, and wherein rollers of the first pair of rollers comprise an extended axis allowing a set of sprockets to support the rollers during movement in the semi-circular grooves connecting the two horizontal movement planes, and to link the rollers to conveyor chains, and wherein rollers of the second pair of rollers comprise a protruding axis allowing a set of sprockets to support the rollers during movement in the semi-circular grooves connecting the two horizontal movement planes.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
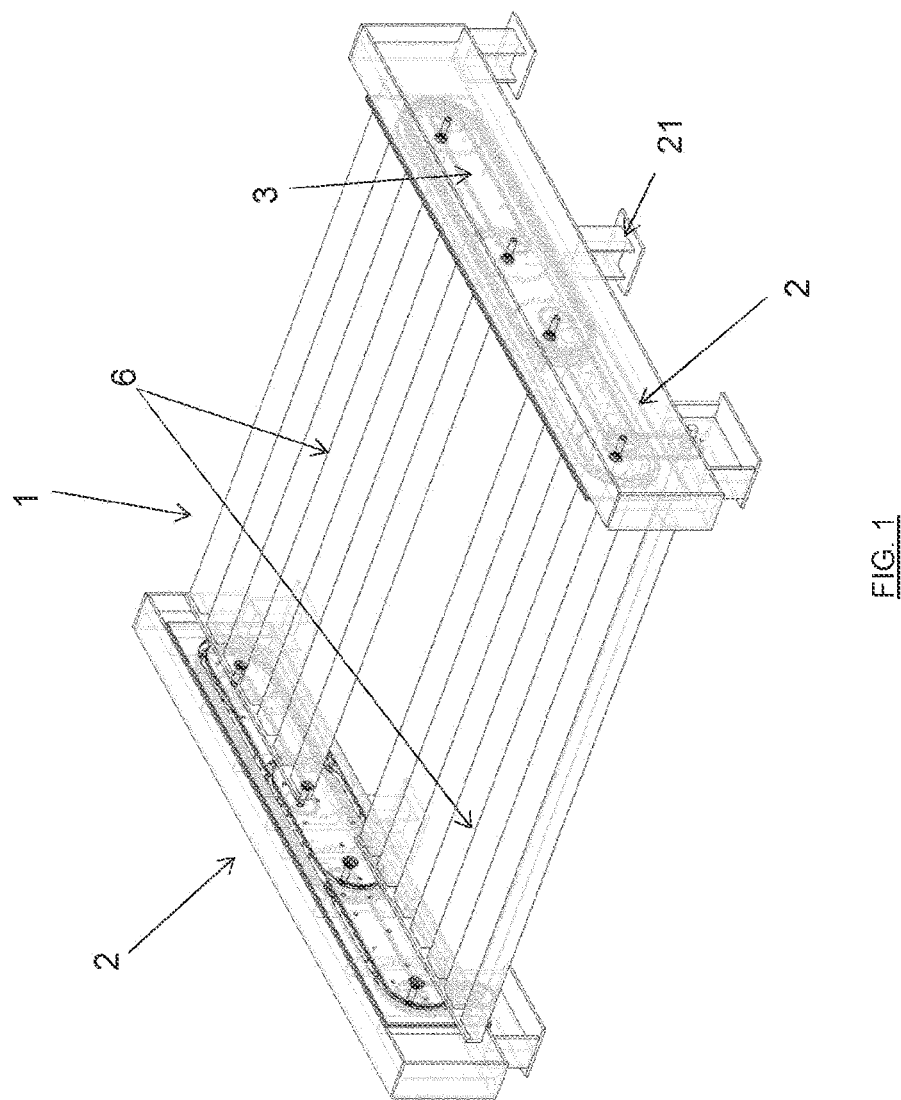
FIG. 1 shows a general three-dimensional view of an embodiment of the pallet switching conveyor according to the present invention, the system comprising two mobile frames in this case.
Figure 2:
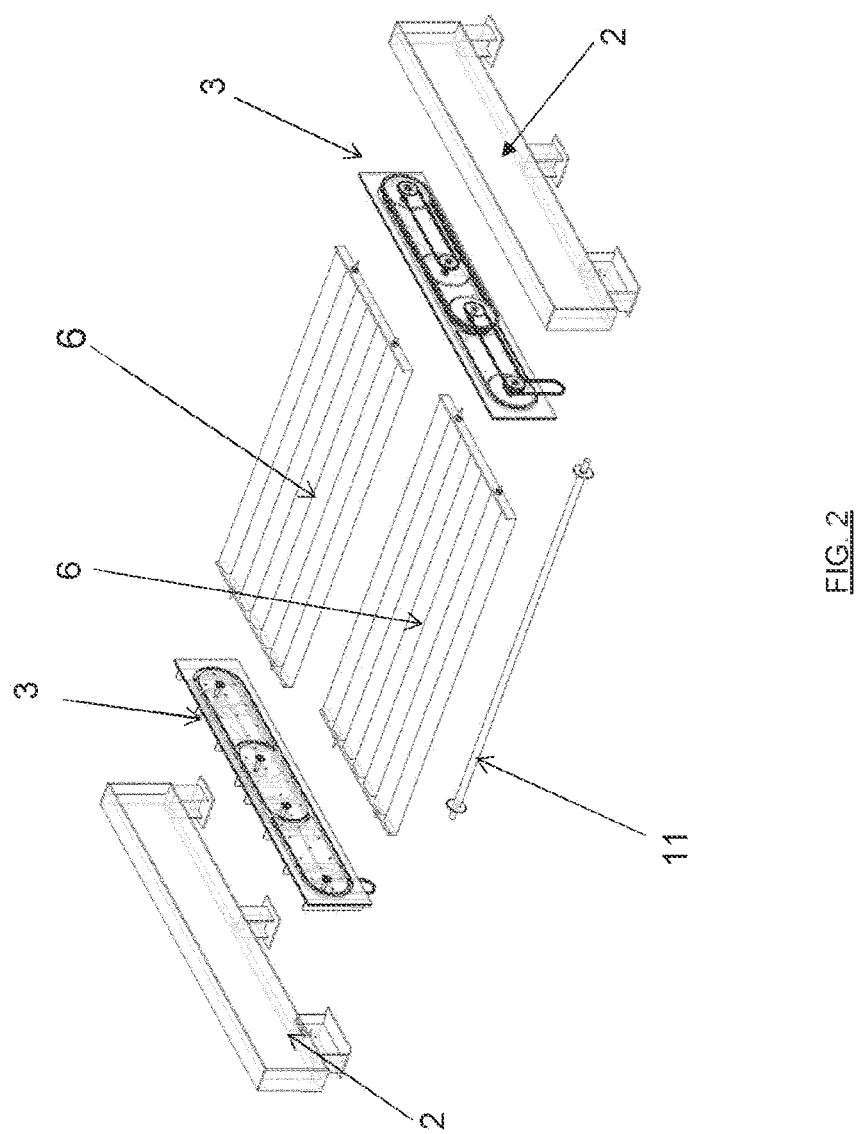
FIG. 2 shows an exploded view of the switcher of FIG. 1.

In an embodiment, the present invention provides a pallet conveyor for simultaneously switching at least two pallets, one taking the place of the other or the one that follows it and vice versa to allow real productive automation of the flows.

One of the main purposes of the present invention is to allow pallet switching without changing the orientation of the load throughout the operation.

In an embodiment, the present invention optimizes the operating rate of a workstation by instantaneously providing what is required for its operation. The flows entering and leaving the workstation can thus always be duplicated by a buffer stock guaranteeing operation with limited interruption of the machine and its operator.

In an embodiment, the present invention provides a solution to improve the flexibility of the task of handlers, or of automated flow management systems. The work of the handler is made more flexible because they can better prioritize the handling flows between the different workstations they control.

In an embodiment, the present invention provides a simple pallet conveyor that can be adapted to a wide variety of equipment. Indeed, it should be possible to combine the conveyor with, for example, different types of automated vehicles, and it should also be designed to integrate with the storage towers of a linear automated warehouse or a warehouse with a cutting laser.

A first aspect of the present invention relates to a pallet switcher comprising:
  a supporting structure;
  at least two mobile frames, each suitable, in use, for carrying a pallet, each mobile frame comprising a first pair of rollers and a second pair of rollers on its lateral sides;
  a conveyor system, located on the supporting structure, which allows the movement of the mobile frames and is connected to a drive shaft;
  a set of guiding grooves forming a closed loop having separate rails, and a guiding path for each mobile frame, comprising a first path and a second path, said grooves receiving the rollers of the mobile frames;
  a cam switching system for the pairs of rollers in the guiding grooves;
  the cam switching system being suitable for guiding, in use, the pairs of rollers so that the first pair follows the first path and the second pair follows the second path so as to move the mobile frames along the closed loop while remaining permanently parallel to each other horizontally and oriented in the same direction, the guiding grooves comprising a groove corresponding to an upper horizontal movement plane, a groove corresponding to a lower horizontal movement plane, two semi-circular grooves allowing downward movement from the upper plane to the lower plane, and two semi-circular grooves allowing upward movement from the lower plane to the upper plane, said grooves defining the two aforementioned paths, which have an oblong shape and are offset horizontally relative to one another;

characterized in that the rollers of the first pair of rollers comprise an extended axis allowing not only a set of sprockets to support said rollers during their movement in the semi-circular grooves connecting the two horizontal movement planes, but also to link said rollers to said conveyor chains;

and in that the rollers of the second pair of rollers comprise a protruding axis, allowing a set of sprockets to support said rollers during their movement in the semi-circular grooves connecting the two horizontal movement planes.

According to preferred embodiments of the invention, the pallet switcher further comprises one of the following features, or an appropriate combination thereof:

the supporting structure comprises two parallel beams, the conveyor system and the set of guiding grooves being distributed symmetrically on or in each of the beams, so that the mobile frames are moved between the two beams by the conveyor system;

the conveyor system comprises a plurality of sprockets and transmission chains, or alternatively a plurality of pulleys and toothed belts, to set the two mobile frames in motion via two conveyor chains located on either side of the mobile frames, so that the mobile frames are moved using mobile rollers rolling inside the guiding grooves;

the switching system comprises a plurality of cams making it possible to guide the first and second pairs of rollers respectively in the first and second paths of the guiding grooves;

the bearing races of the two pairs of rollers of each mobile frame have a common part at the upper and lower horizontal movement planes and are distinct at the semi-circular grooves, allowing the upward and downward movements of the mobile frames;

the mobile frames are solid or perforated.

The invention also relates to the use of the pallet switcher described above, for implementing the following movement cycle relative to the swapping of the initial positions of a first mobile frame and a second mobile frame, each suitable for supporting a pallet:

at the start of the cycle, the conveyor system is activated by the rotation of the drive shaft when the first mobile frame is in position on the upper horizontal movement plane, the extended axis of each front bearing roller being driven by the conveyor chain and suitable for engaging with the sprockets during movements in the semi-circular grooves connecting the two horizontal movement planes; and the protruding axis of each rear bearing roller being suitable for engaging with the sprockets during movements in the semi-circular grooves connecting the two horizontal movement planes;

under the driving effect, the front bearing roller reaches the intersection of the upper horizontal groove and the first downward groove;

a first cam located at this intersection being in the lowered position, with a straight part followed by an oblique part, the front bearing roller remains guided in the upper horizontal groove and then in the second downward groove owing to the sprocket, the meeting of the roller with the oblique part of the first cam causing said cam to be lifted, the oblique part tilting to the horizontal and the straight part being lifted, freeing the passage in the first downward groove for the rear bearing roller;

a second cam located at the intersection of the upper horizontal groove with the first upward groove in the horizontal position, the rear bearing roller crosses the opening toward the first upward groove and continues its path in the upper horizontal groove;

the first cam being lifted, the rear bearing roller is guided in the first downward groove;

when the front bearing roller reaches the lower horizontal groove, it continues to be driven further into this groove by the conveyor chain while, simultaneously, the rear bearing roller reaches the third cam at the end stroke in the first downward groove, said third cam being in the lowered position, which allows the rear roller to pass;

the mobile frame continues its movement in the lower horizontal groove and the front bearing roller lifts the third cam to continue its stroke;

the rear bearing roller supported by the sprocket is driven in the second upward groove, and the front bearing roller supported by the sprocket is driven in the first upward groove, so as to effect the transfer from the lower movement plane to the upper movement plane;

the front bearing roller reaches the upper horizontal groove by lifting the second cam, simultaneously with the rear bearing roller;

the first mobile frame returns to its starting position in the upper horizontal groove and the second cam and first cam are either in the lowered position for the next cycle owing to gravity, or are returned to the lowered position by an ad hoc mechanism;

the movements are similar for the second mobile frame, the latter being in position on the lower horizontal movement plane at the start of the cycle.

Another aspect of the present invention relates to a storage tower of an automated tower or vertical warehouse, comprising, integrated into its base, a pallet switcher as described above.

Yet another aspect of the invention relates to an automated manufacturing facility, comprising an automated warehouse as well as at least one bending cell and/or one laser cutting cell, said automated warehouse comprising at least one storage tower as described above.

The present invention relates to a pallet switching conveyor, that is to say, a system making it possible to simultaneously switch at least two pallets, one taking the place of the other or of the one that follows it on the conveyor and vice versa, without changing the orientation of the load to allow true flow automation. The switching conveyor allows the creation of a buffer stock, guaranteeing production operation with limited interruptions. In the remainder of the description, the switching conveyor will simply be referred to as a switcher.

The device, as illustrated in FIG. 1, consists of a supporting structure 2, composed of two parallel beams, and a conveyor system 3. The conveyor system 3 comprises a set of mechanical elements located on or integrated into each of the beams of the supporting structure 2, which allow at least two mobile frames 6 located between the two beams to be set in motion. These mobile frames 6 can serve as a support for handling pallets, for example, in particular pallets of standard dimensions such as European pallets.

The supporting structure 2 can either be placed on the ground or separated therefrom by feet 21 of variable height depending on the intended application. The two parallel beams of the supporting structure 2 are independent or interconnected. The dimensions and the embodiment of the supporting structure 2 are determined by the type of application considered and by the size and weight of the elements to be supported.

Figure 3:
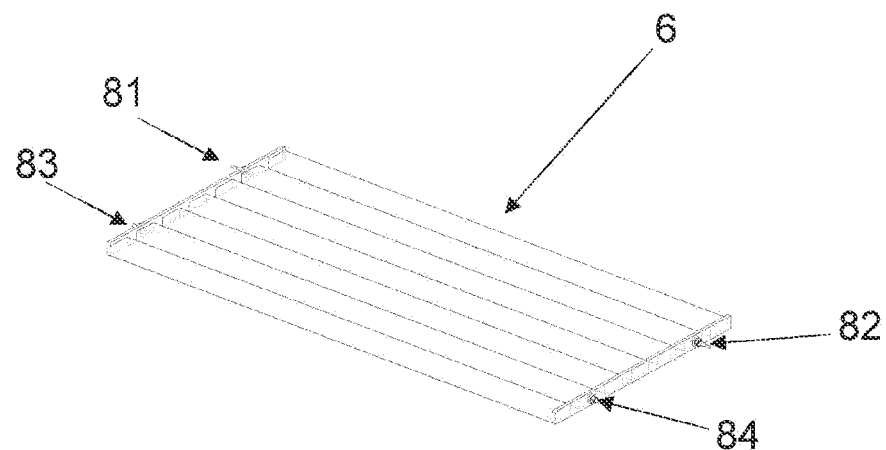
FIG. 3 shows a three-dimensional view of a first example of a mobile frame of the pallet conveyor according to the present invention.
Figure 9:
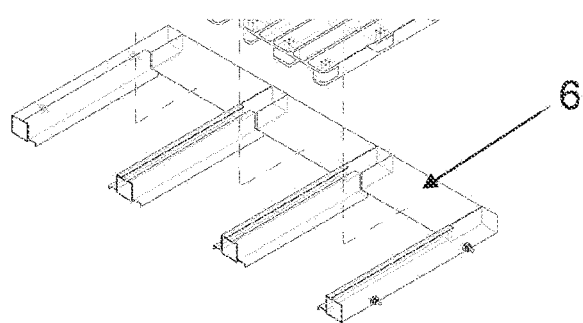
FIG. 9 shows a second example of a mobile frame according to the invention, the latter being open on one side to easily place a pallet thereupon using a forklift, for example.
Figure 10:
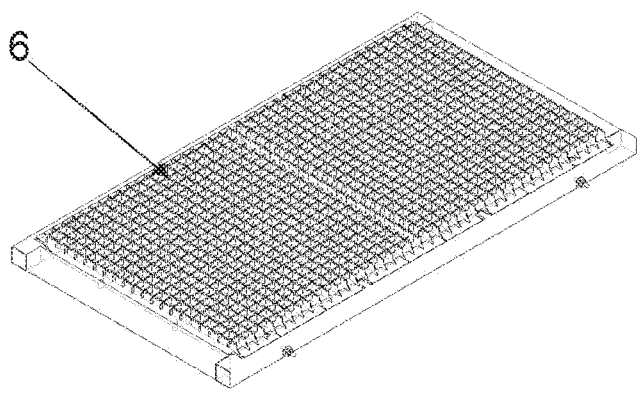
FIG. 10 shows a third example of a mobile frame of the conveyor according to the invention.

FIGS. 3, 9 and 10 describe, by way of non-exhaustive example, several possible embodiments for the mobile frames 6. These are either essentially solid, or hollowed out, perforated or slatted, which allows them to support and move various types of pallets. FIG. 9 in particular illustrates an alternative embodiment of a mobile frame 6, which is open on one of its long sides and intended to easily receive several standardized pallets, such as Euro pallets, for example. The opening along one of the long sides allows the removal or placement of the pallets by an automated guided vehicle. FIG. 10 illustrates a mobile frame 6 in the form of a table with crenellated combs such as the one used in laser cutting machines to receive the sheets to be cut.

The conveyor system 3 of the switcher 1 of the present invention operates in a closed loop, as outlined below, so as to be able to reverse the position of the mobile frames 6 in a few seconds. The conveyor is an "over/under" conveyor or a conveyor with lower level return, that is to say, when there are at least two mobile frames 6, one is in the high position and the another in the low position, and they trade positions via a movement performed by the conveyor system 3 according to a so-called double rail or offset rail system.

The conveyor system 3 comprises, as explained previously, a set of mechanical elements for setting the mobile frames 6 in motion, namely a set of sprockets 4, 41-49 and transmission chains 51-53, as well as two conveyor chains 5. The sprockets 4, 41-49 and chains 5, 51-53 form an undercarriage making it possible to carry out the parallel and simultaneous movement of the mobile frames 6, the conveyor chains 5 having a drive function for the mobile frames 6 as explained later. In certain applications, the sprockets 4, 41-49 and chains 5, 51-53 can advantageously be replaced by pulleys and toothed belts.

Figure 4:
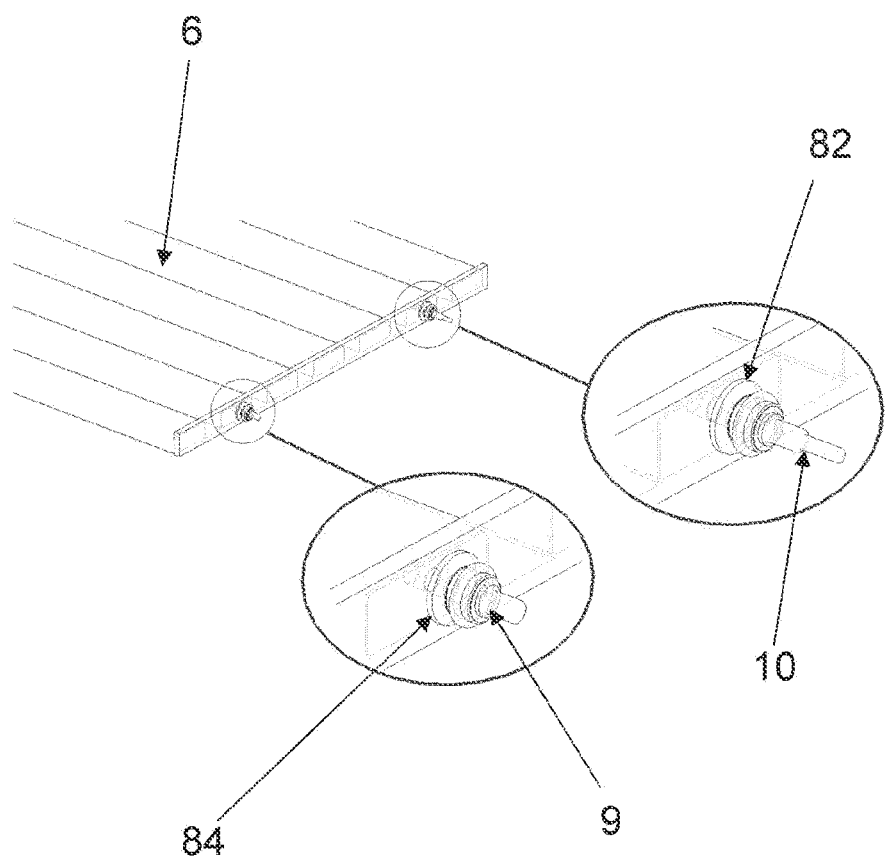
FIG. 4 shows a detailed view of the rollers of the mobile frame of FIG. 3.

Each mobile frame 6 is provided with bearing and guiding rollers 8, 81 to 84 as shown in FIGS. 3 and 4. These are located on the lateral sides of the mobile frame 6 and cooperate with guiding grooves 7. In the context of this description, the "lateral" sides of each mobile frame 6 are considered to be the sides parallel to the beams of the supporting structure 2 and the "transverse" sides are considered to be those perpendicular to these beams. The mobile rollers 8 operate in pairs, a first pair with the rollers 81 and 82 and a second pair with the rollers 83 and 84. In the context of this description, the "front" part of the system is considered to be the part located on the side where the frame is in the forward position when it is in the high position, and vice versa for the "rear" part.

Figure 8:
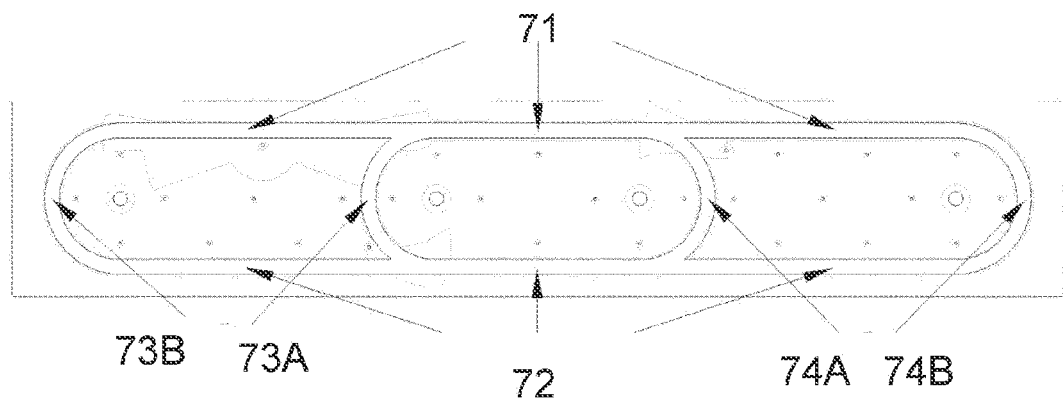
FIG. 8 shows an elevation view of the different types of rails of an example of a conveyor system of the switching conveyor according to the present invention.

The guiding grooves 7, as shown in FIG. 8, constitute a bearing race for the rollers 8 of the mobile frames 6. An essential element of the invention lies in the fact that the first pair of rollers 81 and 82 and the second pair of rollers 83 and 84 of a same mobile frame 6 will take a different path within the guiding grooves 7, so as to allow the two mobile frames 6 to be kept horizontal during the entirety of their movement. The two different paths are taken owing to a switching system as explained below.

More specifically, the guiding grooves 7 are outlined in FIG. 8. The groove 71 corresponds to an upper horizontal movement plane. The groove 72 corresponds to a lower horizontal movement plane. The semi-circular grooves 73A, 73B allow downward movement from the upper plane to the lower plane, while the semi-circular grooves 74A, 74B allow upward movement from the lower plane to the upper plane. The bearing races of the two pairs of rollers 8 are partially common on the horizontal parts, but different at the semi-circular grooves, which allows the upward and downward movements of the mobile frames 6. In use, the first pair of rollers 81 and 82 takes an external path 73B for the descent and an internal path 74A for the ascent, while the second pair of rollers takes an internal path 73A for the descent and an external path 74B for the ascent. This can also be done in the opposite way; this is one example for the proper understanding of the present invention, as are the definitions of the "front" and "rear" parts, which depend on the direction of rotation of the rollers 8 on the closed loop, which can of course be reversed. Owing to this "offset-rail" movement, a parallel movement between the two mobile frames 6 is constantly maintained. A small vertical separation between the two horizontal levels is preferable, but depends on the type of application. For example, a distance of 20 to 30 cm between the horizontal planes of the two mobile frames 6 can be considered, preferentially with a distance of 24 cm, or more if necessary.

To allow the mobile frames 6 to follow the appropriate path in the grooves 7, the system is provided with a switching system, for example a set of cam-bridges 12, 121-123, as shown in FIGS. 5 and 11A to 11H. The operation of an example switching system is described in detail in the following section.

Figure 12:
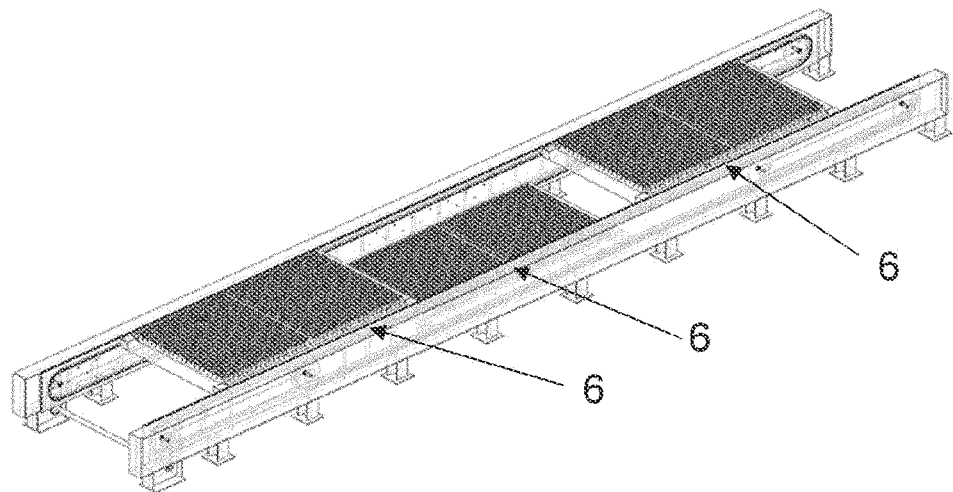
FIG. 12 shows a three-dimensional view of a pallet switcher according to the invention, comprising three mobile frames.

As shown in FIG. 12, there can be more than two mobile frames 6. The case shown depicts an embodiment of a switcher with three mobile frames 6. The principle of the invention remains identical, namely a conveyor system 3 with chains, sprockets and a system of switches to correctly direct the pairs of "front" and "rear" rollers of each mobile frame 6. The number of mobile frames 6 can thus be multiplied.

Description of the Bearing Race of the Mobile Frames and their Drive Principle

As shown generally in FIGS. 3 and 4, a pair of rollers, for example the second pair of rollers 83, 84, comprises a protruding axis 9, allowing the rollers to be supported by the sprockets 4 during movements within the semi-circular grooves 73A and 74B connecting the two horizontal movement planes. This is achievable owing to the fact that the various sprockets 4 are located inside each of the aforementioned semicircles, the toothed wheels of the sprockets 4 coinciding with the semi-circular grooves 73A and 74B. The first pair of rollers 81, 82, in turn, has an extended axis 10, which allows the rollers not only to be supported by the sprockets 4 during movements in the semi-circular grooves 73B and 74A connecting the two horizontal movement planes, but also to link them to the conveyor chains 5 located on both sides of the switcher 1. It will be noted that the extended axis 10 and the protruding axis 9 can be located either on the rollers of the first or the second pair, depending on the position of the conveyor chains relative to the sprockets. In view of the function to be performed, the extended axis 10 is longer than the protruding axis 9.

Figure 5:
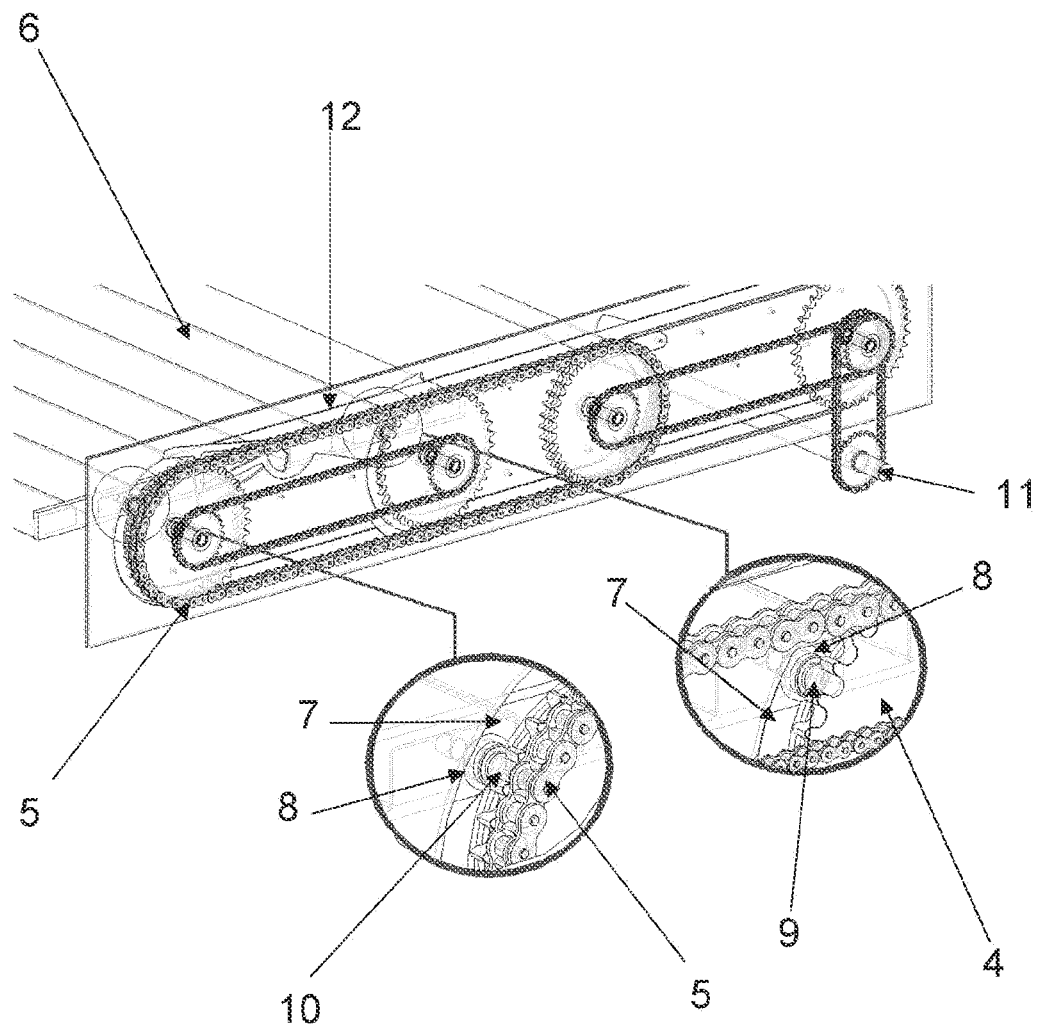
FIG. 5 shows a detailed view of the first example of a mobile frame combined with the conveyor system of the switching conveyor according to the present invention.

The detailed views of FIG. 5 illustrate the principle of linking the rollers 81, 82, 10 to the conveyor chain 5 as well as the principle of accompanying the rollers 83, 84, 9 thanks to the sprockets 4 in the upward and downward movements of the mobile frame 6.

Figure 6:
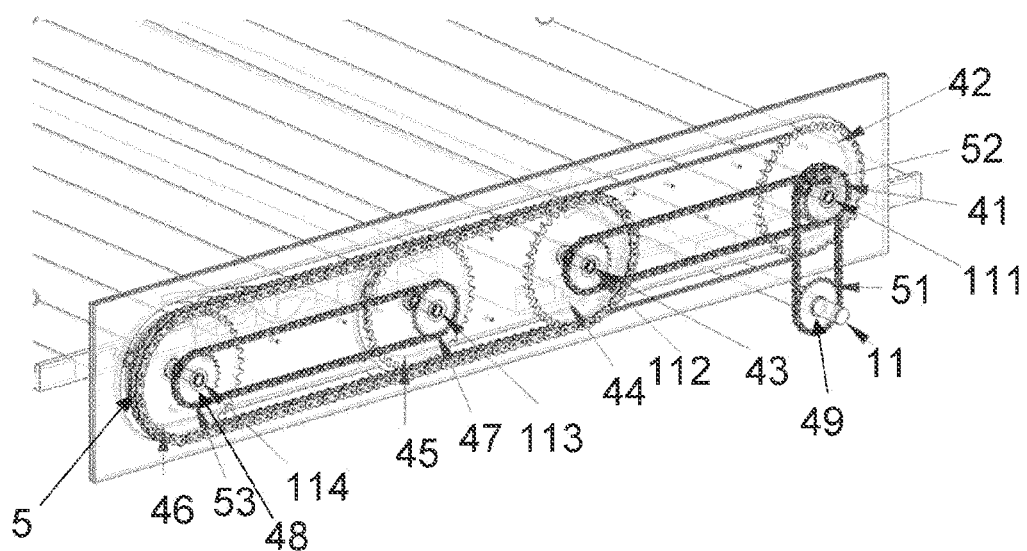
FIG. 6 is a view of FIG. 5 with the details of the reference marks.

As shown in FIG. 6, the drive shaft 11 simultaneously drives the sets of sprockets located on both sides of the switcher 1. The sprockets of the drive shaft 49 drive those of the shaft 111 via the chain 51. The corresponding sprocket 41 drives the sprockets of the shaft 112 via the chain 52. The sprocket 44 in turn drives the sprocket 45 of the shaft 113, which itself is connected by the chain 53 to the sprocket 48 of the shaft 114.

Figure 7:
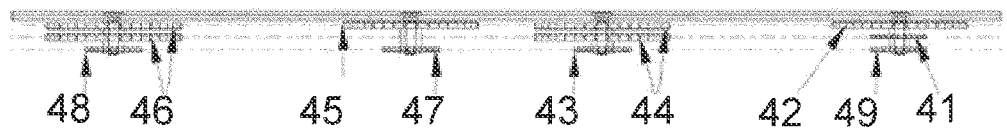
FIG. 7 shows a planar view of an example of the switching conveyor transmission system according to the present invention.

FIG. 7 shows the three parallel positioning planes of the sprockets as well as the arrangement of the transmission chains 51 to 53 and of the conveyor chain 5. The sprockets are therefore all driven simultaneously and at the same angular speed.

Description of a Complete Switching Cycle of a Mobile Frame and of an Exemplary Means for Solving the Problems of Routing Bearing Rollers Via Articulated Cam-Bridges FIGS. 11A to 11F illustrate, according to a non-limiting embodiment of the invention, a complete switching cycle of a mobile frame 6. A system of switches, here illustrated by a set of cam-bridges 121-123, makes it possible to guide the rollers 8 in the appropriate grooves 7 to allow each mobile frame 6 to remain horizontal.

Figure 11A:
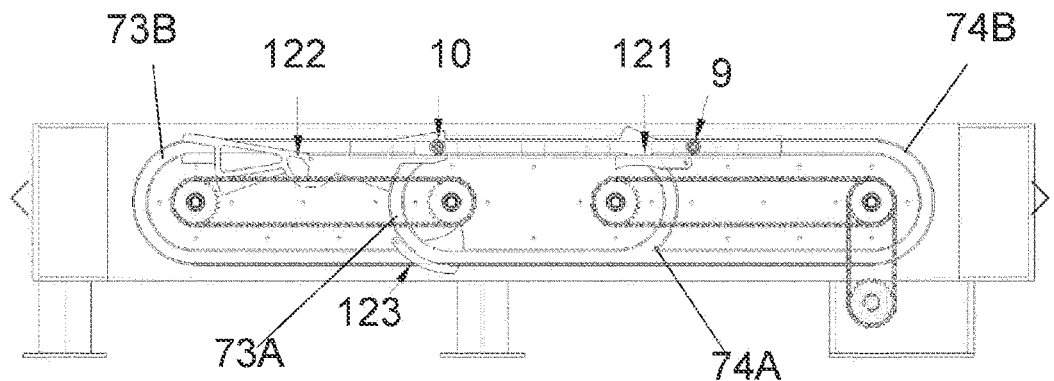
FIGS. 11A to 11H show the successive steps of a complete switching cycle of a mobile frame with different switches, according to one embodiment of the present invention.

In FIG. 11A, the cam 122 is in the lowered position to prevent the roller 10 from following the first downward groove 73A it encounters. The cam 121 is also in a horizontal position to allow the roller 9 to cross the opening formed by the meeting of the upward groove 74A and the upper horizontal groove 71.

Figure 11B:
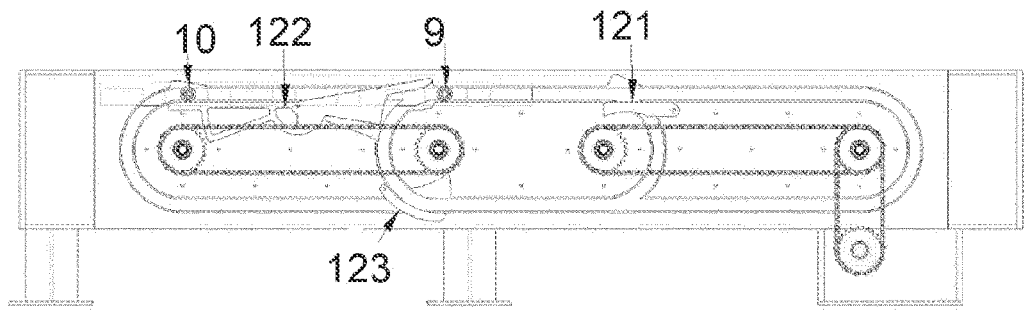

In FIG. 11B, the roller 10 encounters the oblique part of the cam 122 and tilts the latter to the horizontal, at the same time causing the right part of the cam 122 to be lifted. The roller 9 can thus enter the downward groove 73A, the opening being free.

Figure 11C:
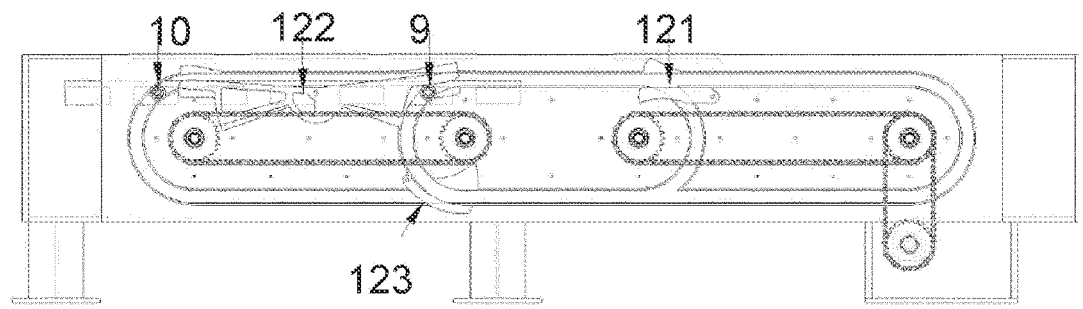

FIG. 11C shows the rollers 10 and 9 which have entered the two respective downward grooves 73B and 73A.

Figure 11D:
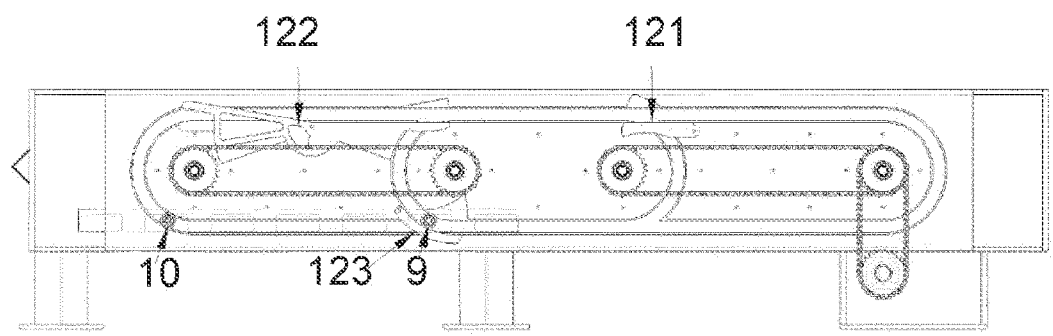

In FIG. 11D, the roller 10, driven by the chain 5 to which it is linked, reaches the groove corresponding to the lower movement plane. The same is true for the roller 9 that is supported at the end of its stroke by the cam 123.

It will be noted that, if the roller 10 is the "front" roller and the roller 9 is the "rear" roller when the mobile frame 6 is in the upper movement plane, the front/rear position of the rollers 10 and 9 is reversed when the mobile frame is in the lower movement plane.

Figure 11E:
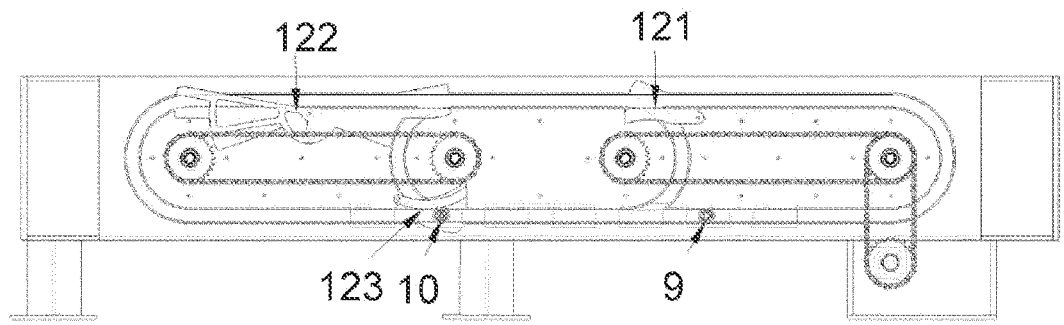

In FIG. 11E, the mobile frame continues its movement within the lower horizontal groove. The roller 10 meets the cam 123 and lifts it to continue its stroke.

Figure 11F:
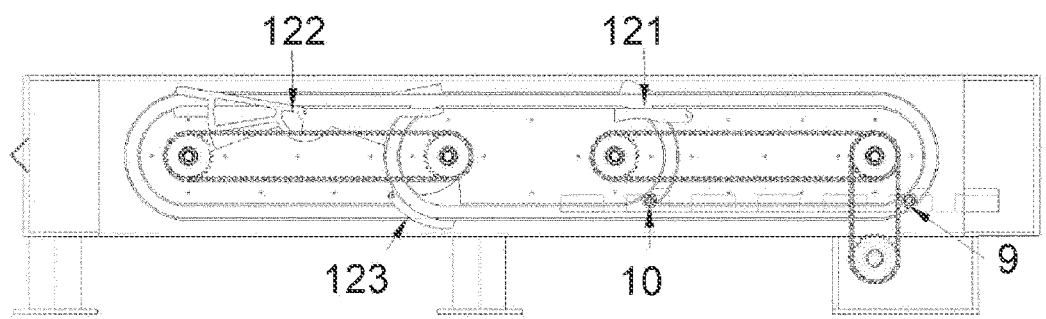

In FIG. 11F, the roller 10, driven by the chain 5 to which it is secured and supported by the sprocket 44, is now in the upward groove 74A. The same is true for the roller 9 that is supported during the transfer from the lower movement plane to the upper movement plane by the corresponding sprocket 42.

Figure 11G:
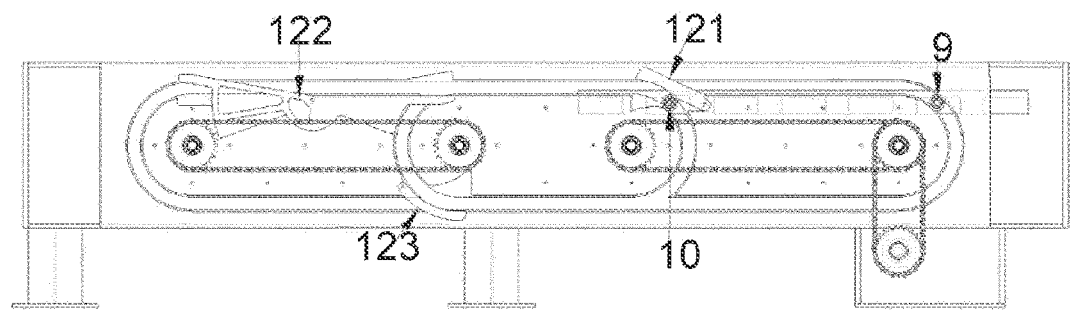

In FIG. 11G, to rejoin the upper horizontal groove 71, the roller 10 lifts the cam 121.

Figure 11H:
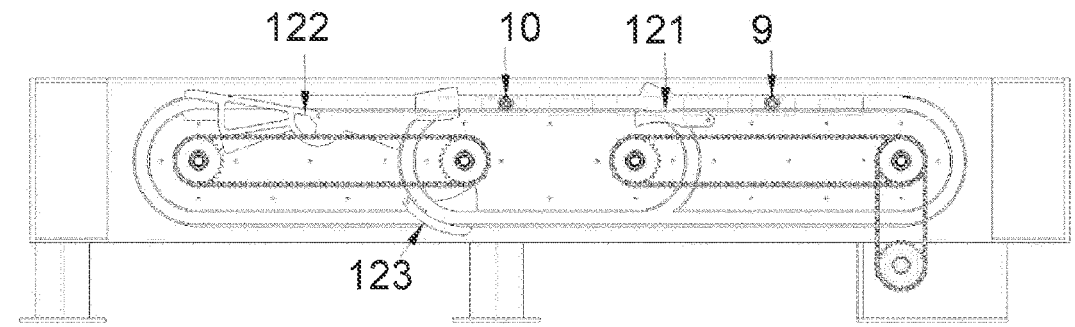

In FIG. 11H, the rollers 9 and 10 are in the upper movement groove 71. The cams 122 and 121 are again in the horizontal position. At the end of the cycle, all the cams have returned to their initial position either by gravity or by means of an ad hoc mechanism. For example, the volume of the cam 122 is hollowed out at its oblique side on the left, which allows it to return to its initial position by gravity once the roller 10 or 9 has passed.

Compatibility of the Switching System with a Manual Handling Mode

In workshops where the handling flows are not automated, the presence of switchers according to the invention would offer a dual advantage. On the one hand, the flows entering and leaving the workstation would always be duplicated by a buffer stock guaranteeing practically uninterrupted operation of the machine and its operator. On the other hand, the handler's work would be made more flexible because the latter could better prioritize the handling flows between the different workstations for which they are responsible.

Some workshops are already relying on the automation of handling. Workstation provision as well as the removal and restocking of shaped parts are thus increasingly ensured by automated vehicles with fully programmed movements.

The switcher according to the present invention is compatible with many pieces of equipment, as explained below. This makes it useful in performing multiple tasks.

Figure 13:
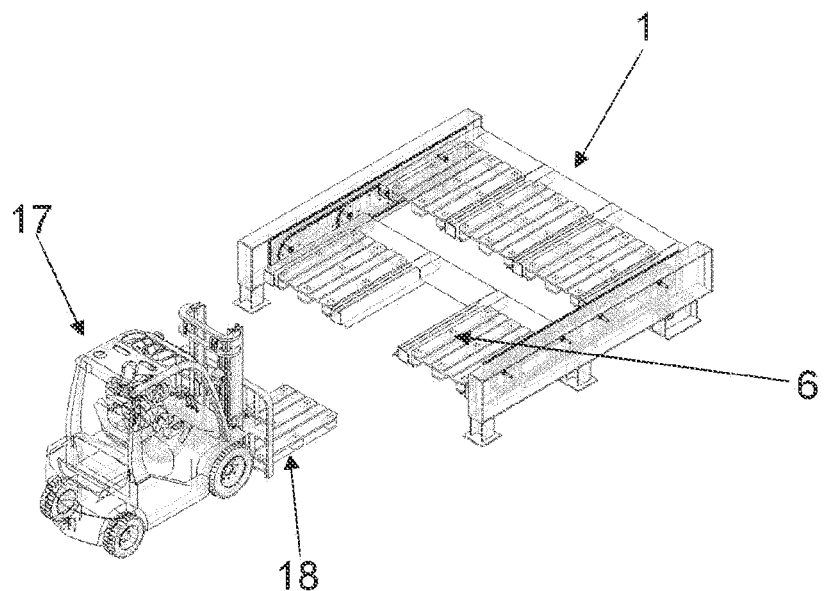
FIG. 13 shows a three-dimensional view of a pallet switcher according to the invention with three sets of two mobile frames, the mobile frames being open on one side to easily place a pallet thereon using a forklift.
Figure 14:
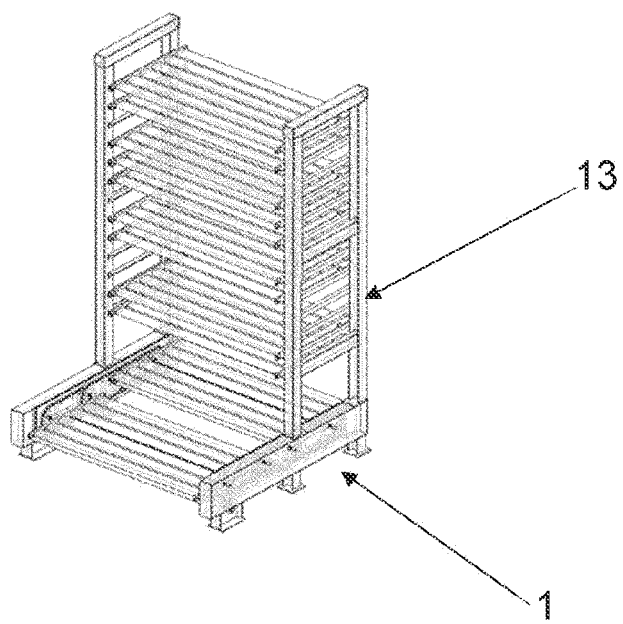
FIG. 14 shows a three-dimensional view of a pallet switcher according to the invention with two mobile frames, associated with a storage tower of a linear automated warehouse.

As shown in FIG. 13, the pallet switcher 1 can be equipped with mobile frames 6 that are open on one of the sides perpendicular to the beams of the supporting structure. This allows different types of automated vehicles to easily access the pallets, including automated vehicles without forks that can slide under the pallet and lift it out of its housing.

In a preferred embodiment of the invention, the pallet switcher 1 is advantageously designed to be integrated into the storage towers 13 of a linear automated warehouse. The beams of the supporting structure 2 of the pallet switcher 1 are then sized to receive the load represented by the dead weight of the storage tower 13 plus the weight of the pallets loaded with their contents. The height of the ladders of the storage towers 13 associated with a switcher 1 is reduced by the height of the latter so that they are aligned with the height of the standard towers of the warehouse. The pallet switcher 1, owing to its geometry, is therefore advantageously compatible with the storage towers 13 of the automated warehouse.

Figure 15:
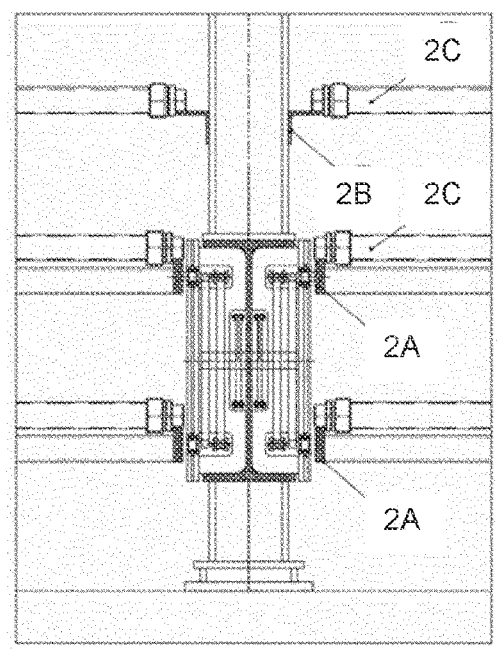
FIG. 15 shows a detailed view of the insertion elements of a switcher according to the invention in an automated warehouse tower.

As shown in FIG. 15, the lateral crosspieces 2A of the mobile frames 6 of the switcher 1 are aligned with the profiles 2B supporting the open-fronted pallets 2C specific to automated warehouses, so that the open-fronted pallets 2C can be transferred from the switcher 1 to one of the stalls in the warehouse and vice versa. In this way, the pallets are compatible with the storage towers 13, whether it is a standard storage tower or a storage tower 13 comprising a pallet switcher 1 integrated into its base. This movement operation is carried out by a pallet lifter circulating parallel to the storage towers. The symmetry of the beam forming the supporting structure of the switcher 1 makes it possible to duplicate the mechanism when several switchers 1 are juxtaposed, while respecting the alignment with the ladders of the towers of the automated warehouse.

Figure 16A:
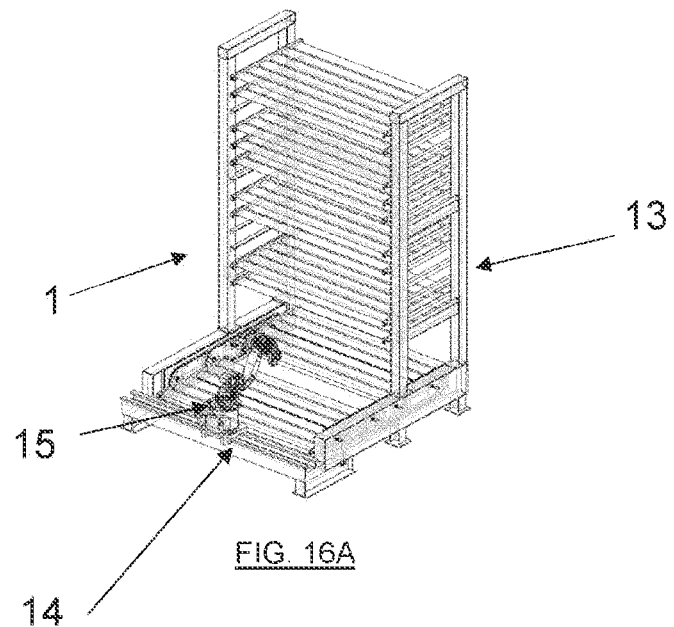
FIGS. 16A and 16B show an automated warehouse segment in which the workstation, a bending cell, for example, is connected by a switcher, respectively two switchers according to the invention, to the towers of the warehouse.
Figure 16B:
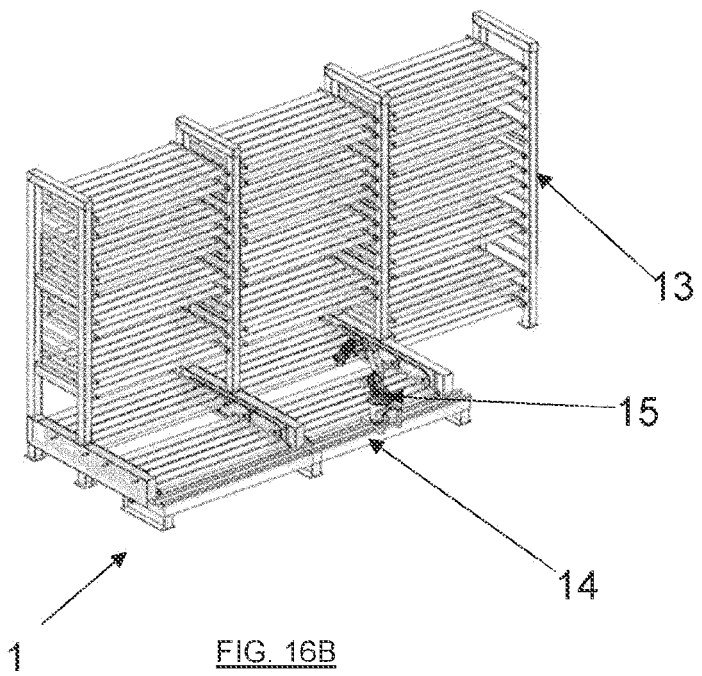
Figure 17:
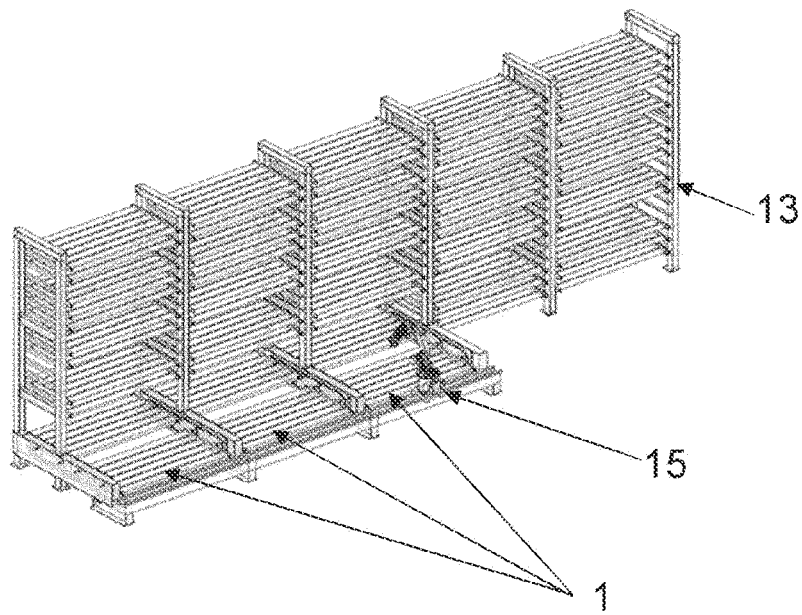
FIG. 17 shows an automated warehouse segment in which the workstation, a bending cell, for example, is connected by three switchers to the towers of the warehouse.

Still according to the invention, the structure of the switcher 1 can be adapted to integrate a track 14 and a robot 15, as shown in FIGS. 16A and 16B. For example, this configuration could be particularly interesting in the case of a bending cell 16A by giving it practically unlimited unassisted operating autonomy and an operating rate maximized by the presence of the switcher 1. In the configuration shown in FIG. 16B, the automated cell 16 is connected by two switchers 1 to two of the towers 13 of the automated warehouse. This double connection makes it possible to automatically introduce the parts to be bent into the cell and to deposit the bent parts on the second switcher 1 according to a pre-established interlocking and stacking program. If there is only a single switcher 1 connecting the cell 16A and the warehouse, as shown in FIG. 16A, this switcher could introduce a pallet into the microcell, which is connected to a single tower of the automated warehouse, one part of the surface of which pallet being occupied by the flat parts to be bent and another part being left free to receive the bent parts. These same parts could also be deposited in bulk in containers placed on the pallet. The advantage of the pallet switcher of the present invention is that it is modular and adaptable to a whole series of equipment, multiplying the time savings and the productivity of the production workshops.

A switcher 1 configuration comprising three mobile frames 6 is a particularly advantageous embodiment of the invention. Indeed, this mode makes it possible to switch three elements simultaneously in a single operation lasting a few seconds. It is particularly interesting when the method is broken down into three phases. This is the case, for example, for laser cutting machines 16B where the steps of the method, namely cutting, removing the cut parts and preparing the new sheet, are often carried out successively and not simultaneously, thus causing waiting times during which the machine is not productive. This configuration is also distinguished by its great simplicity of design as well as its compactness.

In some cases, it could be advantageous to provide a triple connection of an automated cell 16A to the warehouse. The third entrance can be used by way of example and non-exhaustively to introduce, into the cell 16A, tools shared between several bending cells 16A connected to the warehouse, specific tools dedicated to a customer, elements making it possible to optimize the stacking of the bent parts, large grippers, etc.

Figure 18:
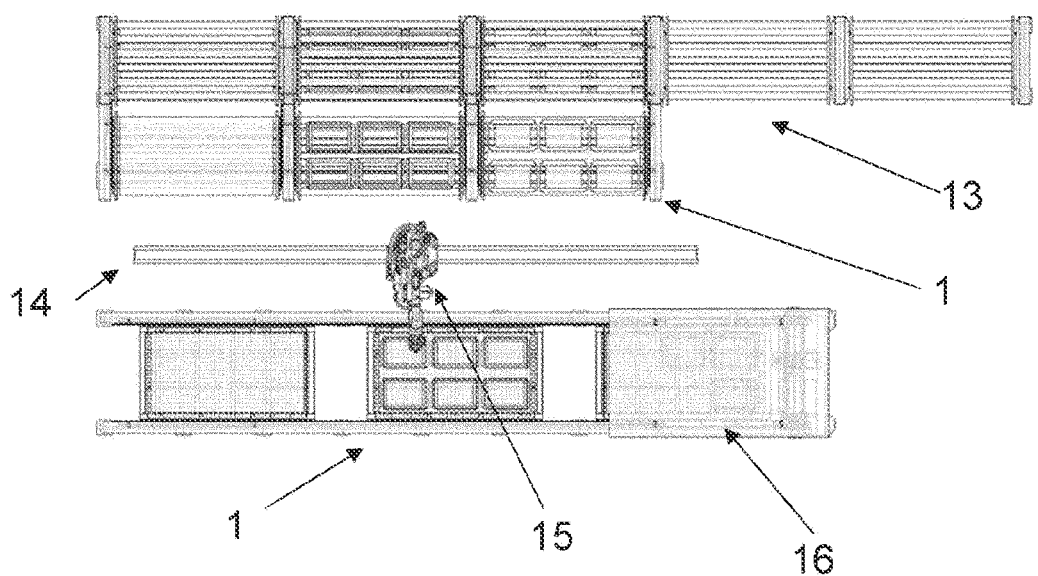
FIG. 18 shows a planar view of an example facility combining, on the one hand, a switcher according to the invention equipped with three mobile frames, integrated with a cutting laser, and on the other hand, three switchers according to the invention equipped with two mobile frames integrated into the towers of an automated warehouse. The facility further includes a robot moving on a track.
Figure 19:
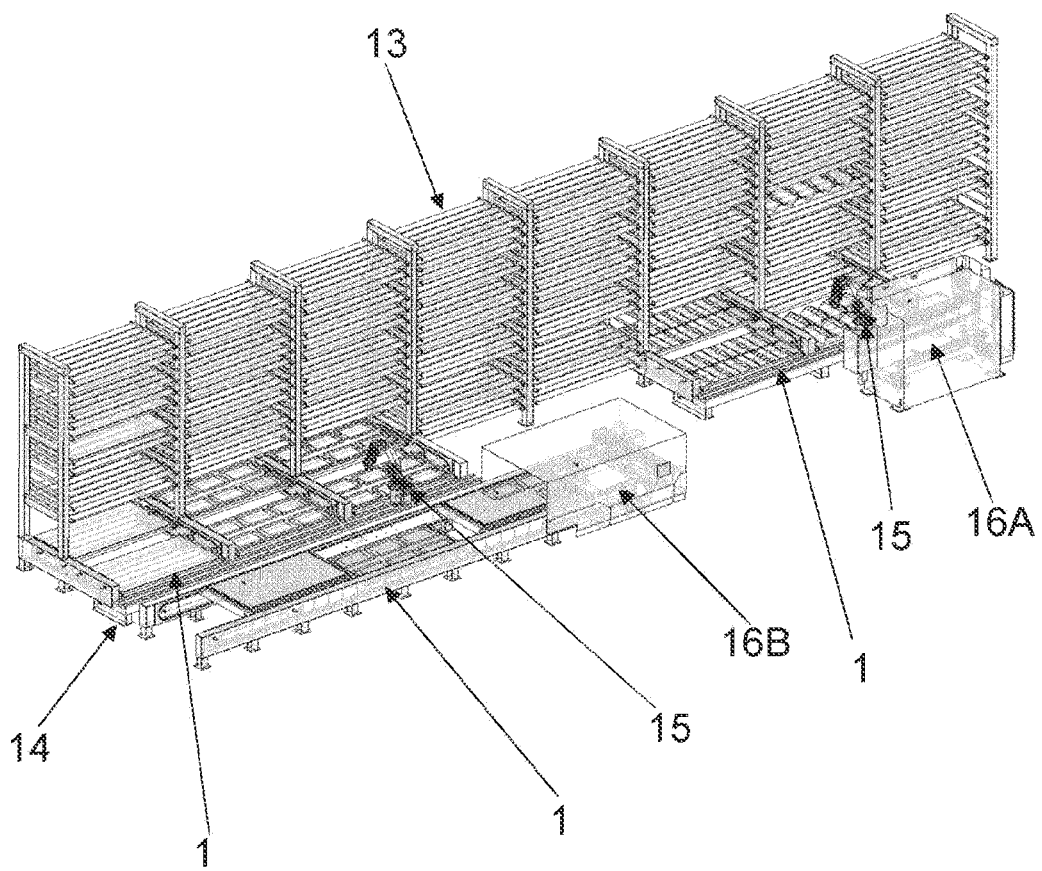
FIG. 19 shows a three-dimensional view of the facility of FIG. 18.

The example shown in FIGS. 18 and 19 illustrates a facility combining on the one hand a switcher 1 equipped with three mobile frames 6 integrated with a cutting laser, and on the other hand three switchers 1 each equipped with two mobile frames 6 integrated into the towers 13 of an automated warehouse. The facility further comprises at least one robot 15 moving on a track 14. This illustration highlights the compactness of the laser and its servo system consisting of a switcher 1 with three mobile frames and a robot mounted on a track. When the laser has completed a cutting sequence, the three laser tables start moving simultaneously to bring a new sheet to the machine in a few seconds, the operating rate of which machine is thus maximized. As soon as the laser begins a new cutting sequence, the robot 15 will take a new sheet from the first switcher 1 of the warehouse and place the new sheet on the table of the laser located opposite. Then, it will take the parts cut out during the previous sequence and deposit them on the second switcher 1 of the warehouse. Once this work is completed, the robot 15 will remove the sheet skeleton to the third switcher 1 of the warehouse. The various grippers necessary for the robot 15 to carry out the handling of parts of various sizes as well as skeleton scraps can for example be advantageously arranged on the external faces of the storage towers 13 of the warehouse. The robot 15 is sized so that its extension length enables it to reach the places farthest from the laser tables or from the pallets of the switchers 1 of the warehouse. The supporting structure of the switcher can be used to support the track and the robot. A variant with columns and suspended track is also possible.

Figure 20:
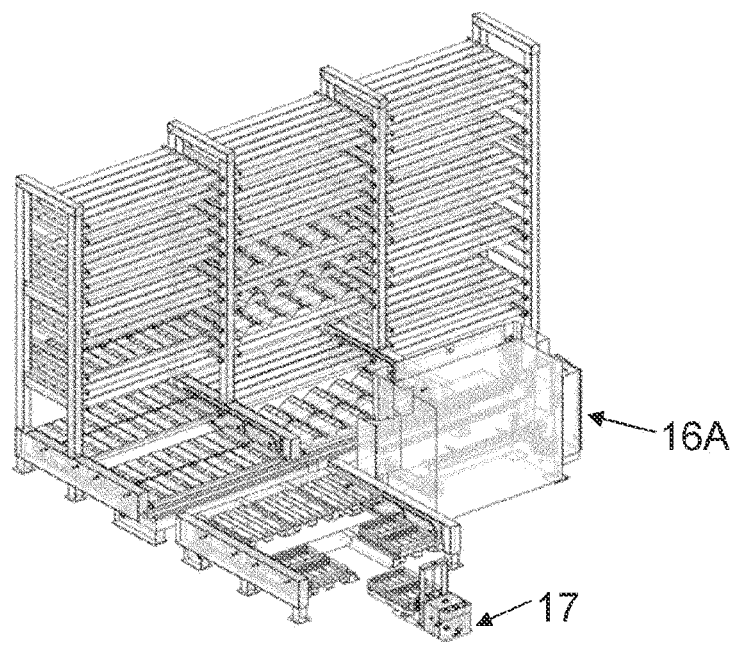
FIG. 20 shows a combination of different procurement flow management modes of an automated cell, provided with a switcher according to the present invention.

FIG. 20 shows a combination of different procurement flow management modes for the cell 16A. In addition to being directly connected to the automated warehouse, the cell 16A is equipped with a switch 1 dedicated to Euro pallets, facing the workshop and making it possible to manage part of the incoming and outgoing flows using an assisted lift 17 or an automatically guided and programmed vehicle.

Figure 21:
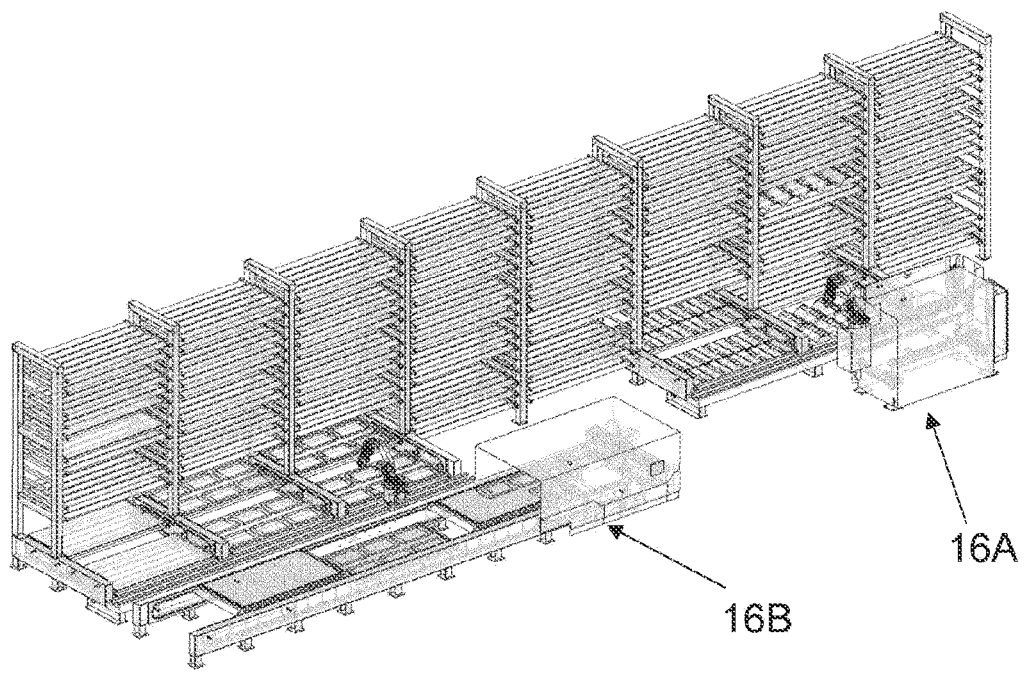
FIG. 21 shows different automated cells arranged around a linear automated warehouse to connect all the machines together and thus increase the unassisted operating autonomy and the operating rate of the production tool as a whole.

FIG. 21 shows how it would be possible to arrange the cutting cells 16B, such as lasers or punching machines, as well as the bending cells 16A around a linear automated warehouse to interconnect all the machines and thus increase the unassisted operating autonomy and the operating rate of the production tool as a whole.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Pallet switcher
2 Supporting structure of the switcher
21 Beam foot
2A Mobile frame lateral crosspiece
2B Support profile
2C Open-fronted pallet
3 Conveyor system
4 Sprockets
5 Conveyor chain
51-53 Transmission chains
6 Mobile frame
7 Guiding groove
8 Bearing roller and guiding roller
9 Protruding axis of the roller
10 Extended axis of the roller
11 Drive shaft
111-114 Transmission shafts
12 Cam-bridge
13 Storage tower
14 Track 15 Robot
16A Bending microcell
16B Laser cutting
17 Forklift or automated vehicle
18 Pallet

The invention claimed is:

1. A pallet switcher, comprising:
a supporting structure;
at least two mobile frames, each configured to carry a pallet, each mobile frame of the at least two mobile frames comprising a first pair of rollers and a second pair of rollers on lateral sides of the mobile frame;
a conveyor system, located on the supporting structure and configured to allow, movement of the mobile frames, the conveyor system being connected to a drive shaft;
a set of guiding grooves forming a closed loop having separate rails, and a guiding path for each mobile frame, the set of guiding grooves comprising a first path and a second path, the grooves receiving the rollers of the mobile frames; and
a cam switching system for the pairs of rollers in the guiding grooves;
the cam switching system being configured to guide, in use, the pairs of rollers so that the first pair of rollers follows the first path and the second pair of rollers follows the second path so as to move the mobile frames along the closed loop while remaining permanently parallel to each other horizontally and oriented in a same direction,
wherein the guiding grooves comprise a groove corresponding to an upper horizontal movement plane, a groove corresponding to a lower horizontal movement plane, two semi-circular grooves allowing downward movement from the upper plane to the lower plane, and two semi-circular grooves allowing upward movement from the lower plane to the upper plane, the guiding grooves defining the first path and the second path, which have an oblong shape and are offset horizontally relative to one another,
wherein rollers of the first pair of rollers comprise an extended axis allowing a set of sprockets to support the rollers during movement in the semi-circular grooves connecting the two horizontal movement planes, and to link the rollers to conveyor chains,
and
wherein rollers of the second pair of rollers comprise a protruding axis, allowing a set of sprockets to support the rollers during movement in the semi-circular grooves connecting the two horizontal movement planes.

2. The pallet switcher of claim 1, wherein the supporting structure comprises two parallel beams, the conveyor system and the set of guiding grooves being distributed symmetrically on or in each parallel beam of the two parallel beams, so that the mobile frames are movable between the two parallel beams by the conveyor system.

3. The pallet switcher of claim 1, wherein the conveyor system comprises a plurality of sprockets and transmission chains, or, alternatively, a plurality of pulleys and toothed belts, to set the two mobile frames in motion via two conveyor chains located on either side of the mobile frames, so that the mobile frames are movable using mobile rollers rolling inside the guiding grooves.

4. The pallet switcher of claim 1, wherein the switching system comprises a plurality of cams configured to guide the first and second pairs of rollers, respectively, in the first and second paths of the guiding grooves.

5. The pallet switcher of claim 1, wherein bearing races of the two pairs of rollers of each mobile frame have a common part at the upper and lower horizontal movement planes and are distinct at the semi-circular grooves, allowing the upward and downward movements of the mobile frames.

6. The pallet switcher of claim 1, wherein the mobile frames are solid or perforated.

7. A method of using of the pallet switcher of claim 1 to implement a movement cycle relative to a swapping of initial positions of a first mobile frame and a second mobile frame, each configured to support a pallet, the movement cycle comprising:
at a start of the movement cycle, activating the conveyor system by rotation of the drive shaft when the first mobile frame is in position on the upper horizontal movement plane, an extended axis of each front bearing roller being driven by the conveyor chain and configured to engage the sprockets during movements in the semi-circular grooves connecting the two horizontal movement planes, a protruding axis of each rear bearing roller being configured to engage the sprockets during movements in the semi-circular grooves connecting the two horizontal movement planes;
under a driving effect, the front bearing roller reaching an intersection of the upper horizontal groove and the first downward groove;
a first cam located at the intersection being in a lowered position, with a straight part followed by an oblique part, a second cam being located at the intersection of the upper horizontal groove with the first upward groove in the horizontal position;
the front bearing roller remaining guided in the upper horizontal groove and then in the second downward groove due to the sprocket, a meeting of the roller with the oblique part of the first cam lifting the cam, the oblique part tilting to horizontal and the straight part being lifted, freeing a passage in the first downward groove for the rear bearing roller;
the rear bearing roller crossing an opening toward the first upward groove and continuing a path thereof in the upper horizontal groove;
the first cam being lifted, the rear bearing roller being guided in the first downward groove;
upon the front bearing roller reaching the lower horizontal groove, the front bearing roller continuing to be driven further into the lower horizontal groove by the conveyor chain while, simultaneously, the rear bearing roller reaching a third cam at an end stroke in the first downward groove, the third cam being in a lowered position, which allows the rear roller to pass;
the mobile frame continuing a movement thereof in the lower horizontal groove and the front bearing roller lifting the third cam to continue a stroke thereof;
driving the rear bearing roller, which is supported by the sprocket, is in the second upward groove, and driving the front bearing roller, which is supported by the sprocket, in the first upward groove, so as to effect a transfer from the lower movement plane to the upper movement plane;
reaching, by the front bearing roller, the upper horizontal groove by lifting the second cam, simultaneously with the rear bearing roller; and
returning the first mobile frame to a starting position thereof in the upper horizontal groove, and the second cam and first cam being either in the lowered position for a next cycle due gravity, or returned to the lowered position by an ad hoc mechanism, wherein movements for the second mobile frame are similar to movements of the first mobile frame, the second mobile frame being in position on the lower horizontal movement plane at the start of the movement cycle.

8. A storage tower of an automated tower or vertical warehouse, comprising:

the pallet switcher of claim 1 integrated into a base of the storage tower.

9. The storage tower of claim 8, wherein beams of the supporting structure of the pallet switcher are sized to receive a load represented by a dead weight of the storage tower plus a weight of pallets loaded with contents.

10. The storage tower of claim 8, wherein beams of the supporting structure of the pallet switcher are symmetrical and have a geometry enabling duplication of the conveyor system when several pallet switchers are juxtaposed, while respecting an alignment with a standard storage tower or a storage tower comprising the pallet switcher integrated into the base.

11. The storage tower of claim 8, wherein a height of the storage tower associated with the pallet switcher is reduced by a height of the pallet switcher so that the storage tower is aligned with a height of a standard storage tower.

12. An automated manufacturing facility, comprising:

an automated warehouse comprising at least one storage tower of claim 8; and at least one bending cell and/or one laser cutting cell.

13. The automated manufacturing facility of claim 12, wherein the automated warehouse comprises specific open-fronted pallets supported by profiles, and wherein the mobile frames of the switcher comprise lateral crosspieces aligned with the profiles supporting the open-fronted pallets, so that the open-fronted pallets are transferrable from the pallet switcher to the storage tower of the automated warehouse and vice versa, due to the open-fronted pallets being compatible with both the pallet switcher and the storage tower.

* * * * *